US010386585B2

(12) United States Patent
Kaplan

(10) Patent No.: US 10,386,585 B2
(45) Date of Patent: Aug. 20, 2019

(54) ATTACHMENT APPARATUS FOR FIELD INSTALLABLE CABLE TERMINATION SYSTEMS AND METHOD

(71) Applicant: Multilink Inc., Elyria, OH (US)

(72) Inventor: Steve E. Kaplan, Elyria, OH (US)

(73) Assignee: Multilink Inc., Elyria, OH (US)

( * ) Notice: Subject to any disclaimer, the term of this patent is extended or adjusted under 35 U.S.C. 154(b) by 0 days.

(21) Appl. No.: 15/596,509

(22) Filed: May 16, 2017

(65) Prior Publication Data

US 2017/0336577 A1 Nov. 23, 2017

Related U.S. Application Data

(60) Provisional application No. 62/339,413, filed on May 20, 2016.

(51) Int. Cl.
*G02B 6/38* (2006.01)
*G02B 6/44* (2006.01)

(52) U.S. Cl.
CPC ........... *G02B 6/3897* (2013.01); *G02B 6/387* (2013.01); *G02B 6/3881* (2013.01); *G02B 6/3887* (2013.01); *G02B 6/4441* (2013.01); *G02B 6/4452* (2013.01); *G02B 6/4471* (2013.01); *G02B 6/4475* (2013.01)

(58) Field of Classification Search
CPC .... G02B 6/3897; G02B 6/387; G02B 6/3881; G02B 6/3887; G02B 6/4441; G02B 6/4471; G02B 6/4452
USPC .................................. 385/39, 53–56, 65, 83
See application file for complete search history.

(56) References Cited

U.S. PATENT DOCUMENTS 5,129,023 A * 7/1992 Anderson ............ G02B 6/3831
385/60
5,214,732 A * 5/1993 Beard .................. G02B 6/3887
385/78

(Continued)

OTHER PUBLICATIONS

"Fiber Optic ConnectorTutorial", http://www.fiberoptics4sale.com/Merchant2/fiber-optic-connectors.php, (no date given, but printed from internet on Dec. 4, 2015), 14 pages.

*Primary Examiner* — Ryan A Lepisto
(74) *Attorney, Agent, or Firm* — Renner, Otto, Boisselle & Sklar, LLP

(57) ABSTRACT

A fitting for signal connector coupling has a bayonet attachment mechanism including a groove in a fitting wall including guiding groove and retaining groove portions, the retaining groove portion having a recess forming a positive lock to interact with a protruding member of a locking cap or collar, which may be turned onto the fitting until the protruding member resiliently snaps or springs into the recessed portion resisting loosening and providing haptic feedback indicating accomplishing secure attaching. A method of attaching a fitting to another device, includes placing and turning the another device on a cylindrical wall of the fitting while interaction between a groove in the fitting wall and a protuberance on the another device guides the another device rotationally about the fitting wall, and continuing turning moves the protuberance into a positive lock location in a retaining portion of the groove and also provides haptic feedback indicating attachment.

21 Claims, 13 Drawing Sheets

(56) References Cited

U.S. PATENT DOCUMENTS

| | | | | |
|---|---|---|---|---|
| 5,261,019 A | * | 11/1993 | Beard | G02B 6/3821 |
| | | | | 385/60 |
| 5,287,425 A | | 2/1994 | Chang | |
| 5,293,582 A | * | 3/1994 | Beard | G02B 6/3821 |
| | | | | 385/78 |
| 5,428,703 A | | 6/1995 | Lee | |
| 6,602,093 B1 | * | 8/2003 | Cannon | H01R 13/625 |
| | | | | 439/578 |
| 6,808,407 B1 | * | 10/2004 | Cannon | H01R 13/625 |
| | | | | 439/314 |
| 6,975,178 B1 | * | 12/2005 | Kessler | H01P 1/10 |
| | | | | 333/105 |
| 7,090,406 B2 | | 8/2006 | Melton et al. | |
| 8,931,963 B2 | | 1/2015 | Scopic et al. | |
| 2004/0082213 A1 | * | 4/2004 | Felps | H01R 13/625 |
| | | | | 439/332 |
| 2005/0253603 A1 | * | 11/2005 | Capps | G01R 1/06772 |
| | | | | 324/754.07 |
| 2013/0072048 A1 | * | 3/2013 | Schafer | H01R 13/622 |
| | | | | 439/372 |
| 2013/0244467 A1 | * | 9/2013 | Tran | H01R 13/625 |
| | | | | 439/337 |
| 2014/0241670 A1 | | 8/2014 | Barnette, Jr. et al. | |
| 2016/0047994 A1 | * | 2/2016 | Conner | G02B 6/3887 |
| | | | | 385/87 |
| 2016/0139346 A1 | * | 5/2016 | Bund | G02B 6/3825 |
| | | | | 385/56 |

* cited by examiner

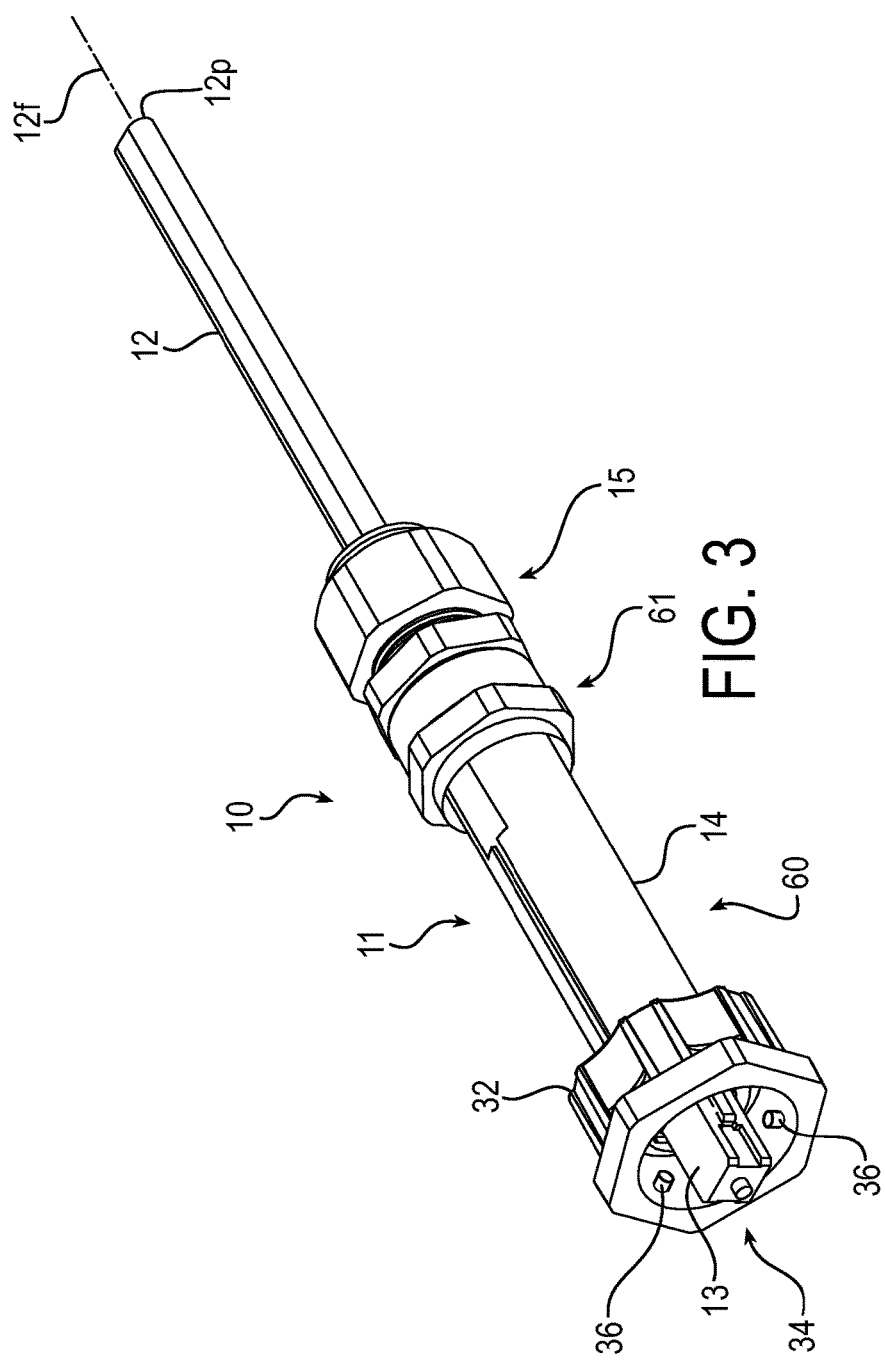

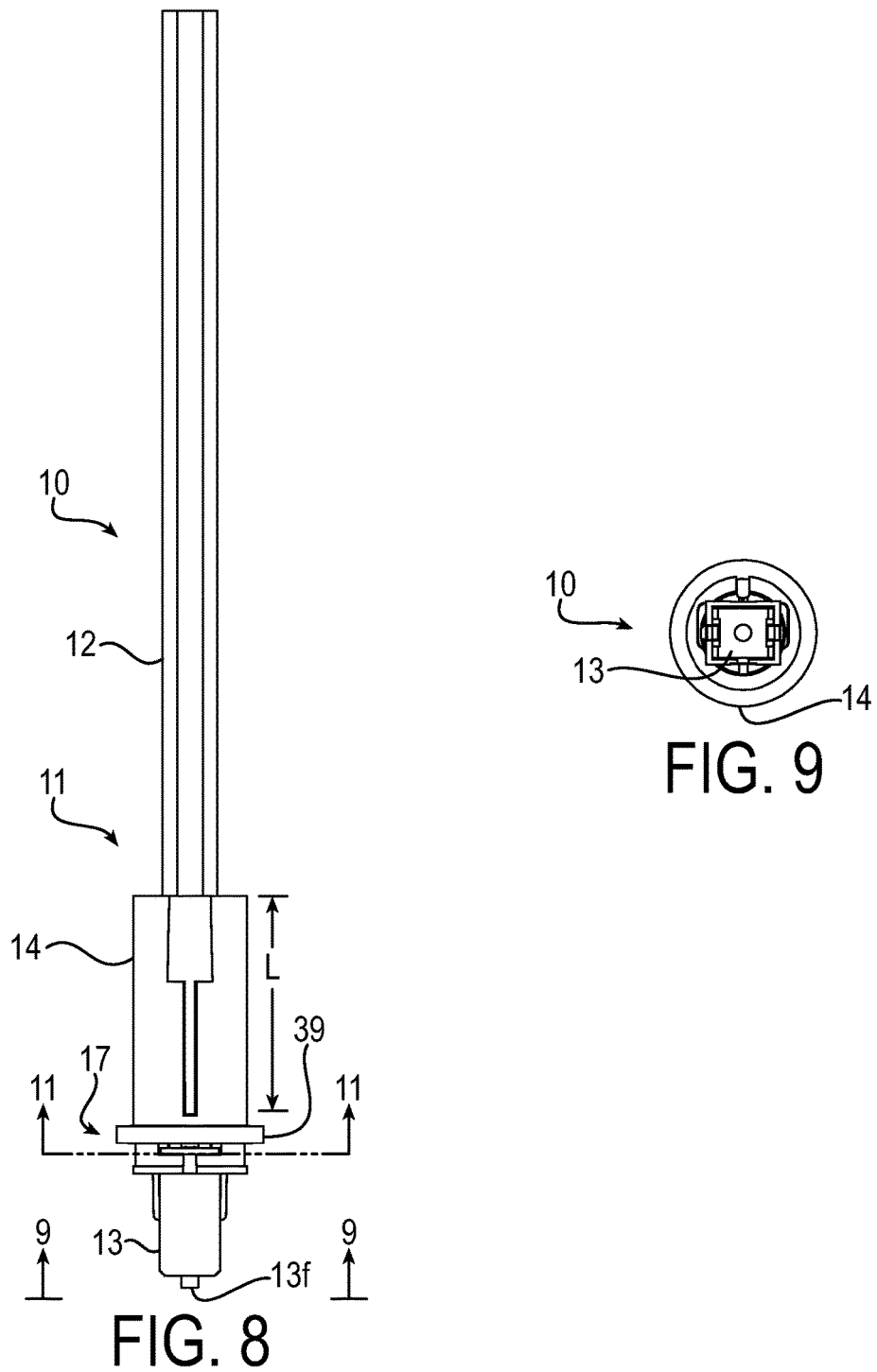

ATTACHMENT APPARATUS FOR FIELD INSTALLABLE CABLE TERMINATION SYSTEMS AND METHOD

PRIORITY CLAIM

Priority is claimed from U.S. Provisional patent application Ser. No. 62/339,413, filed May 20, 2016, the entire disclosure of which hereby is incorporated by reference.

TECHNICAL FIELD

This disclosure relates generally to attachment apparatus for cable termination systems and methods and, more particularly, to attachment apparatus and method for fiber optic drop cables and the like.

BACKGROUND

In the past connectors, such as, for example, threaded connectors or bayonet connectors, were used for attaching fiber optic cables, such as, for example, those fiber optic cables used as drop cables, to another device. A drop cable may be, for example, a line that connects a terminal of a distribution cable or system to a subscriber's premises or may be, for example, a line that connects a terminal of a distribution system at a premises to another system or subsystem also at the premises. Such a line, e.g., a fiber optic line or cable, may carry telephone service, cable TV, a link to a network, and so on. An exemplary distribution system may include a distribution box, panel or the like in which one or more distribution cables are terminated and at which connections are provided from the one or more distribution cables to one or more drop cables, for example.

Loosening of an attachment mechanism of a fiber optic cable, e.g., a drop cable, to a cable distribution box or to some other device, e.g., to another fiber optic cable, to a distribution panel, or the like, has been a source of signal interruption or signal degrading.

For example, consider a distribution box locate at a residential home and a fiber optic drop cable connection to that distribution box to deliver optical signals for cable television, internet connection, telephone, and so on. Loosening of the connection may be caused by various forces applied to the box or to the connection at or in the box due to many different occurrences, such as, for example, a landscaper bumping a lawn mower against the box, sound vibration caused by a lawn mower or other equipment near the box, bumping the box or the building (e.g., a house) to which the box is attached, wind, rain, sprinkler system water jets impinging on the box and causing movement or otherwise disturbing calm placement of the box, and so on.

Also, a service technician who may install or repair a connection between a fiber optic cable and a distribution box may fail to tighten fully and securely such connection, thus, allowing for the possibility for the connection to loosen leading to degrading or interrupting of optical signals intended to be coupled efficiently and effectively. This may occur due to haste, due to inclement weather, e.g., the technician may be wearing gloves during very cold weather and haptic feedback cannot be felt to determine by the technician that a connection has been completely tightened and/or secured, and so on.

SUMMARY

Providing capability for a facile attaching securely and maintaining secure attachment of cables, e.g., fiber optic drop cables, to another device, e.g., to a distribution box or distribution panel (collectively referred to below equivalently as distribution box), or to another cable, and so on, would be advantageous, especially for field installable cables. Maintaining the security and integrity of such attachments may reduce the need for service calls to make repairs.

Briefly, according to an aspect of this disclosure, an attachment apparatus includes a fitting for signal connector coupling includes a bayonet type connection having a female groove including axially and circumferentially initial guiding groove portion with an entrance at one end for a protruding pin-like member and an elongate circumferentially extending retaining groove portion with a snap in locking recess that provides a positive lock to retain the pin-like member and to provide haptic feedback indicating that the pin-like member has snapped into the locking recess.

Moreover, according to another aspect, the attachment apparatus may include another device attachable to the fitting, the another device including a generally cylindrical mounting wall about a hollow interior area configured to fit over and generally parallel to at least part of the fitting, the cylindrical mounting wall having a protruding protuberance pin-like member configured to fit in and to slide along the female groove toward the positive lock and to fit with respect to the positive lock to resist separating of the another device from the fitting.

The attachment apparatus and method of this disclosure may be used to attach a cable termination assembly to another device, such as, for example, a distribution box or to another device, for example to another cable termination assembly, and so on. Such attachment apparatus and method may be used conveniently, with facility and with efficiency to perform attachment in the field as well as in other locations, e.g., a factory or other facility. A cable termination assembly may include, for example, an optical connector and a fiber optic cable, e.g., a cable that includes one or more optical fibers, a housing or support structure that holds the connector and cable in relation to each other to avoid interrupting optical continuity between them and/or to avoid damaging the connector, cable and optical continuity thereof. In this disclosure the fiber optic cable may be, for example, a drop cable or may be another type of optical cable. The fiber optic cable may include one or more fiber optic members and an external protective jacket or cover, and the fiber optic cable also may include one or more other components, e.g., insulators and so on.

The terms fiber optic cable, optical cable, drop cable, cable and so on may be used interchangeably and equivalently herein or as apparent from context. The terms connector and optical connector also may be used interchangeably and equivalently herein, as will be apparent from the description context. Moreover, although this disclosure is directed to use of the attachment apparatus and method to connect optical cable termination assemblies, and so on, the attachment apparatus and method also may be used with electrical cable termination assemblies.

Field installation of a cable termination assembly may be at or near a job site or may be at some other location other than a factory. The field installation technique in some instances may be carried out at a factory, as well, e.g., to repair a termination (sometimes referred to as cable termination or as connector), a cable, or a cable termination assembly (e.g., that includes the cable and the termination), to facilitate making a termination or cable termination assembly for a special order circumstance without having to shut down or slow down a main assembly line, etc.

In a fiber optic cable termination assembly, the fiber optic connector and cable may be mounted in or relative to a housing or support structure to facilitate protecting the fiber optic connector and cable, especially where they are attached to each other, and also to facilitate attaching (also referred to as mounting) the cable termination assembly to another device, e.g., to a distribution box, such as to a bulkhead, wall, surface, etc., of a distribution box.

It would be desirable to facilitate such attaching to make a connection in the field, to facilitate securing attachment, to maintain such the connection, and to provide feedback to a service technician, installer, etc., to confirm that the secure mounting or attaching has been accomplished. This disclosure provides for haptic feedback to indicate or to signal to a technician or the like confirmation that secure mounting or attaching has been accomplished.

Briefly, this disclosure provides attachment apparatus and method for connecting together two devices conveniently, effectively and securely. The attachment apparatus also provides haptic feedback representative of accomplishing a complete and secure connection.

With the above and following in mind, one aspect of this disclosure relates to a fitting for signal connector coupling, including a housing at least part of which is configured to receive at least part of a signal connector, the housing including a cylindrical wall extending along an axis and circumscribing a hollow interior space, a groove in the cylindrical wall, the groove including a guiding groove portion and a retaining groove portion, the guiding groove portion extending both axially and circumferentially about at least a portion of the cylindrical wall, the guiding groove portion configured to guide a protruding member of another device along the groove while cooperation of the guiding groove with such protruding member guides such another device over at least part of the cylindrical wall toward the housing, wherein the retaining groove portion extends generally in a circumferential direction about the axis, and further including a positive lock in the retaining groove portion configured to interact with such protruding member provide a relatively secure locking to retain such other device with respect to the fitting.

Optionally, interaction between the positive lock and such protruding member provides haptic feedback to indicate relatively secure locking of such other device with respect to the fitting.

Optionally, the guiding groove portion extends spirally in the exterior surface of the cylindrical wall at least partly about and along at least part of the length of the axis.

Optionally, the cylindrical wall has a distal end at which the groove has an entrance portion, and wherein the guiding groove portion extends from the entrance portion to the retaining groove portion, and wherein the portions of the groove are connected to provide a path for movement of the protruding member along at least substantially the entire length of the groove.

Optionally, the guiding groove portion extends in a sloping direction relative to the axis of the cylindrical wall from a location at least one of at or near the entrance portion toward the retaining groove portion, and wherein the retaining groove portion extends circumferentially about a portion of the cylindrical wall in a plane that is substantially perpendicular to the axis.

Optionally, the positive lock includes a recess in a wall of the retaining groove portion.

Optionally, the housing includes a signal connector configured to connect with an optical cable termination for coupling optical signals between the signal connector and the optical cable termination.

Optionally, the signal connector is configured to connect at one end with such optical cable termination and at another end with a further optical cable termination.

Optionally, the housing further includes a mechanical connecting portion configured to connect the fitting to a mounting structure.

Optionally, the mechanical connecting portion includes a fastenable cylindrical wall circumscribing a hollow interior, at least part of the fastenable cylindrical wall configured for inserting into a mounting opening of such mounting structure.

Optionally, the fastenable cylindrical wall is threaded, and further including a threaded member that may be threaded onto the thread of the fastenable cylindrical wall to secure the fitting to such mounting structure.

Optionally, the fitting includes a plurality of said grooves, each including a guiding groove portion and a retaining groove portion.

Optionally, the guiding groove portions are generally parallel to each other in the exterior surface of the cylindrical wall; and the retaining groove portions are generally parallel to each other in the exterior surface of the cylindrical wall.

Optionally, the plurality of said grooves includes a total of three grooves that are in the exterior surface of the cylindrical wall and are angularly spaced apart from each other about the axis.

Optionally, another device is attachable to the fitting, the another device including a generally cylindrical mounting wall about a hollow interior area configured to fit over and generally parallel to at least part of the cylindrical wall of the fitting, the cylindrical mounting wall having a protruding protuberance configured to fit in and to slide along the groove toward the positive lock and to fit with respect to the positive lock to resist separating of the another device from the fitting.

Optionally, the protruding protuberance and the guiding groove portion guide the another device to rotate about the axis of the fitting while the another device is urged along the cylindrical wall of the fitting, and upon reaching the retaining groove portion, in response to rotating of the fitting and the another device relative to each other the protruding protuberance moves along the retaining groove portion to the positive lock.

Optionally, there are a number of protruding protuberances axially spaced from each other along the inner surface of the cylindrical mounting wall cooperative with respective grooves in the cylindrical wall of the fitting.

Optionally, included is a resilient member positioned to be compressed between the cylindrical wall and the another device in response to the another device being placed sufficiently in mounted position on the fitting tending so as to urge the another device and fitting away from each other and to urge the protruding member into retained position in the positive lock.

Optionally, the retaining groove portion extends relatively more in a circumferential direction with relatively minimal axial directional component with respect to the axis than does the guiding groove portion that extends with a relatively more axial directional component.

According to another aspect, a method of attaching a fitting to another device, includes placing the another device on a cylindrical wall of the fitting while the interaction between a groove in the cylindrical wall interacts with a protuberance on the another device to guide the another device rotationally about the cylindrical wall, and continuing relative rotating of the fitting and another device to move the protuberance into a positive lock location in an extending retaining portion of the groove.

Optionally, the method further includes providing haptic feedback indicating that the another device and fitting are securely held together.

These and other aspects and features of the invention exemplified by this disclosure will be clear with reference to the following description and drawings, in which embodiments are disclosed to indicate some ways for implementing the principles of the present disclosure. However, it will be appreciated that the scope of the present disclosure is not limited thereto. On the contrary, the present disclosure includes any change, modification and equivalent falling within the scope, spirit and connotation of the accompanying claims.

The term "include/comprise" herein refers to the existence of feature, element, step or component, not excluding the existence or addition of one or more other features, elements, steps, components or combinations thereof.

Various aspects of the present disclosure can be better understood with reference to the following drawings. The components in the drawings are not necessarily drafted to scale, and the emphasis is laid upon clearly illustrating the principles of the present disclosure. For the convenience of illustrating and describing some parts of the present disclosure, corresponding parts in the drawings may be enlarged in size, e.g., enlarged to be shown larger than the case in an exemplary device actually made according to the present disclosure, relative to other parts. Components and features depicted in one drawing or embodiment of the present disclosure may be combined with components and features depicted in one or more other drawings or embodiments. Moreover, in the drawings, the same reference numerals designate corresponding parts throughout the drawings and may be used to designate the same or similar parts, and primed reference numerals may be used to designate parts that are similar to those designated by the same unprimed reference numeral.

BRIEF DESCRIPTION OF THE DRAWINGS

The included drawings are used for providing further understandings of the present disclosure, and they constitute a part of the Specification. Those drawings illustrate the preferred embodiments of the present disclosure and elaborate the principles of the present disclosure together with the descriptions.

In the drawings:

FIG. 2A is an isometric view of a fitting, e.g., a bulkhead fitting, for attaching a cable termination assembly to a distribution box, distribution panel or the like while looking from the front of the box, panel or the like;

FIG. 3 is an isometric view of an assembled cable termination assembly, showing an optical connector, optical cable and support or housing;

FIG. 8 is a top plan view of a portion of the cable termination assembly showing the fiber optic cable, collar and connector;

FIGS. 9 and 10 are front end views of the cable termination looking in the direction of the arrows 9-9 of FIG. 8, FIG. 10 being enlarged relative to FIGS. 8 and 9;

DESCRIPTION

Figure 1:
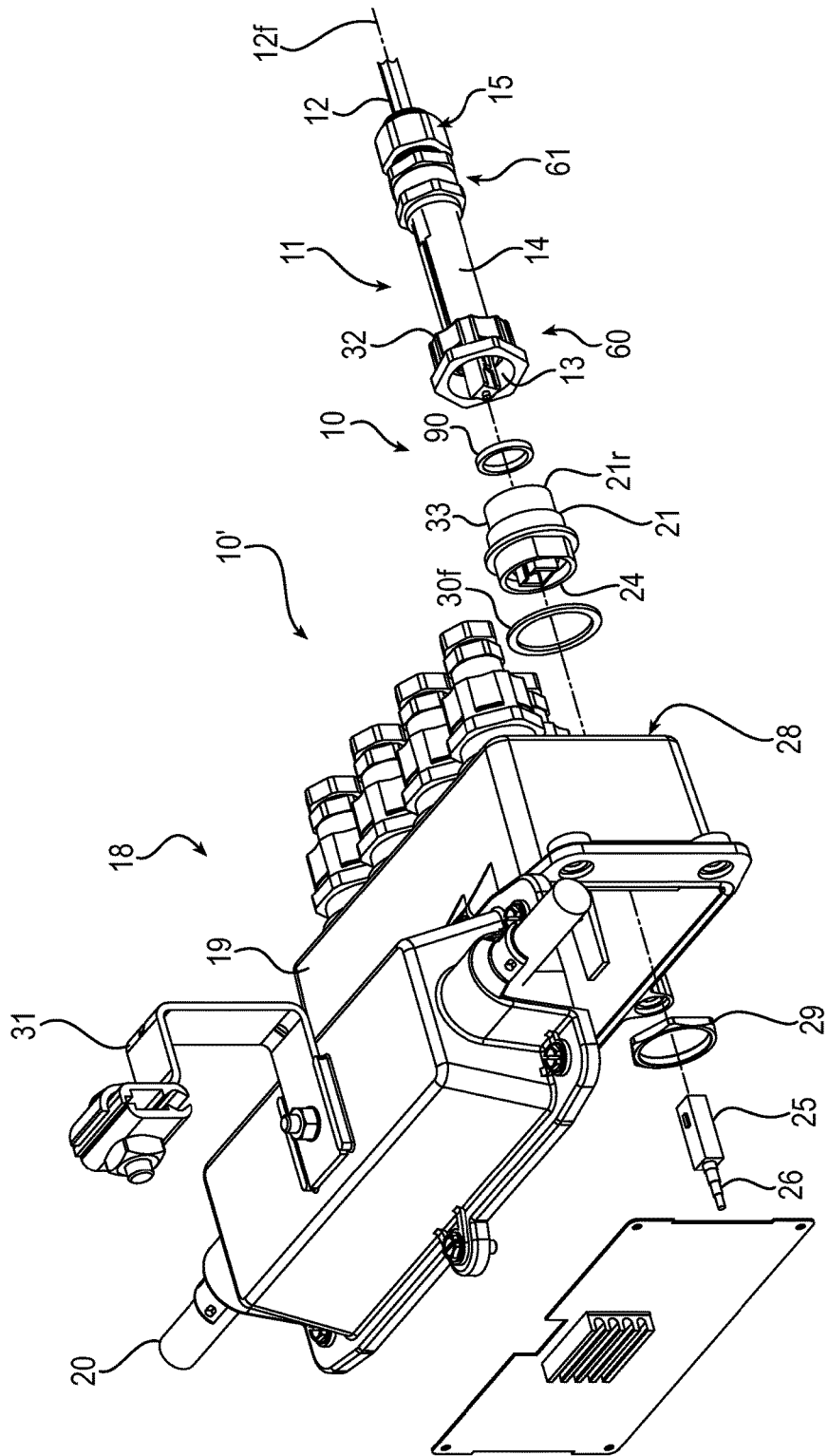
FIG. 1 is an isometric view of a distribution system including a distribution box to which a number of fiber optic cable termination assemblies are attached, one of the cable termination assemblies being shown in exploded view.

Referring in detail to the drawings, and initially to FIG. 1, a number of optical cable termination assemblies 10 are illustrated. The cable termination assembly 10 shown in the foreground is in exploded view and is described in detail below and other cable termination assemblies are shown in partial view for illustrative purposes, as there may be more or fewer cable termination assemblies than shown, and they may be the same as or different from the foreground cable termination assembly 10.

Cable termination assembly 10, which sometimes is referred to below as "termination assembly" for brevity, includes a cable termination 11 and a cable 12. An example of the cable 12 is an optical cable, also referred to as a fiber optic cable, one example of which is a drop cable. In the description below the drop cable is a single fiber drop cable—e.g., it has only a single fiber optic member that carries or transmits optical signals. An exemplary fiber optic member 12*f* is shown schematically in the drawings. However, it will be appreciated that this disclosure is not limited to such cable, and the cable may be another type of cable. Also, the cable termination 11 includes an optical connector 13, for example, one referred to as an SC connector. Also, it will be appreciated that this disclosure is not limited to such connector, and the connector may be another type of connector that currently exists, e.g., an LC connector or other connectors, or connectors that may come into existence in the future. The various parts of the cable termination assembly 10, may be configured to accommodate other types of connectors and cables. The cable termination 11 also includes housing 14 (sometimes referred to as collar) in which the connector 13 is positionable, e.g., at least part way into the housing, whereby the housing 14 holds, supports and protects at least part of the connector. The termination assembly 10 includes the termination 11, the cable 12 having a fiber optic member 12*f* attached to the connector 13, and a strain relief 15, which tends to prevent the cable 12 from being pulled out from the housing.

Figure 10:
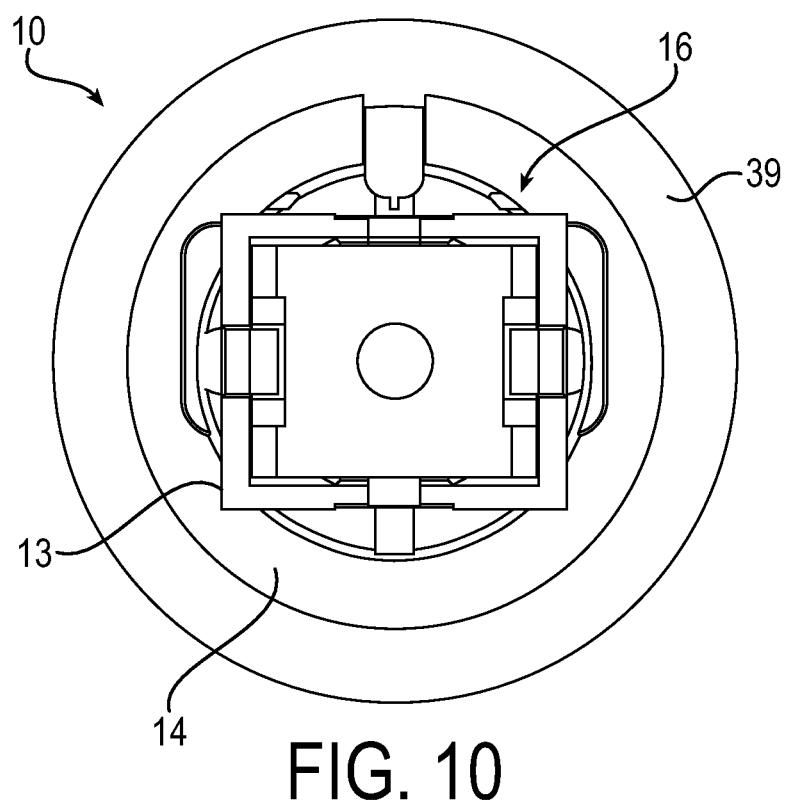

As is seen in several of FIGS. 1-14 of the drawings, the connector 13 of the cable termination assembly 10 is positioned with respect to the housing (collar) 14. For example, as illustrated, the housing 14 may be in the form of a hollow tubular member or collar in which at least part of the connector 13 is positioned. As is described further below, the collar 14 includes an insertion limiting mechanism 16 (seen in FIGS. 10, 11 and 13) that facilitates positioning of the connector 13 with respect to the collar, e.g., to limit or to restrict the length or distance that the connector is inserted into the collar. Moreover, the cable termination assembly 10 includes a retainer mechanism 17 (seen in FIGS. 4, 5, 6, 8 and 11) that prevents or blocks the connector 13 from exiting the collar 14, e.g., by being pulled out or falling out of the collar, after the connector has been positioned in the collar. In a sense the retainer mechanism 17 is a securement mechanism that helps to secure the connector 13 in the collar. Part of the cable 12 is positioned in the collar 14 and the fiber optic member 12f is coupled to the connector 13 to conduct or couple optical signals between the fiber optic member and the connector. The actual connection or coupling of the connector 13 and fiber optic member 12f may be located in the collar 14 and, therefore, is protected from damage by force, environment, etc. from outside the collar, while the connector is maintained in position in the collar by the insertion limiting mechanism 16 and the retainer mechanism 17 and the strain relief 15 prevents externally applied strain to the cable from affecting the cable that is within the collar 14.

As is described further below, the retainer mechanism 17 includes a retaining clip that presses into the collar or housing 14 that has a slot-like opening or groove. The clip retains the connector 13 at least partly in the collar by locking in the groove in front of part of the connector to block exiting of the connector from the collar. A resilient O-ring functions to hold the retaining clip in place, to provide a watertight seal function, and to provide a resilient or spring effect to keep a locking collar tightly secured to an external device, e.g., to a bulkhead fitting or the like, when the locking collar is attached to the external device to hold the collar to the external device. The connector 13 includes a connector portion 13c, which provides a signal coupling function, and a holder portion 13h. The holder portion fits over the connector portion and in cooperation with the retaining clip retains the connector in position in or with respect to the collar. The holder portion also prevents both rotation and front to back movement of the connector relative to the collar—these in cooperation with features of the collar, as will be described further below.

Turning to FIG. 1, the termination assemblies 10 are connected in a distribution system 18, which includes a connections housing or box 19 in which or at which connections for coupling signals may be made between and/or among one or more termination assemblies and/or with a main distribution cable 20 containing one or more optical and/or electrical conductors for carrying respective signals. A distribution panel (not shown) or the like may be substituted for and/or used in connection with the box 19—reference to box herein similarly may include distribution panel and the like. At or in the box 19, distribution panel or the like optical signals of respective termination assemblies 10 and/or the main distribution cable 20 may be coupled to another termination assembly or to signal conductor(s) of the main distribution cable, for example, or to some other device (not shown). Also or alternatively, apparatus may be included in or associated with the box 19 to perform conversion of optical signals to electrical signals and/or vice versa; and the converted signals may be coupled to respective cable termination assemblies 10, to the distribution cable, or to other connections that are not shown in FIG. 1.

Referring to FIGS. 1 and 2A through 2I an illustrated bulkhead fitting 21 is an example of a fitting for attaching a termination assembly 10 to the box 19 and to optical or other circuitry or other components in the box. The fitting 21 includes a housing 22, e.g., made of a plastic or other material. Electrically non-conductive material may be preferred. In the interior 23 of the fitting 21 is a connector 24 (seen in FIG. 1 but omitted for clarity of illustration in FIG. 2) of a type that can bridge between two connectors, such as, for example, the SC connector 13 of a termination assembly 10 and another SC connector 25 that is in the box 19 to couple signals therebetween. The SC connector 25 may be connected, for example, to a fiber optic cable 26 or other cable in the box 19. The fitting 21 has a connection portion in the form of a screw thread 27 at one end, which may be positioned through an opening (not shown) in an attachment wall or bulkhead wall 28 of the housing 19. A bulkhead adapter nut 29 inside the housing 19 may be placed on and tightened on the screw thread 27 to draw the fitting 21 securely to the bulkhead wall 28 to mount the fitting to the housing. As the nut 29 is tightened, a flange 30 is pulled to the bulkhead wall 28 and compresses a bulkhead adapter seal 30f (FIG. 1), such as a resilient O-ring or washer, against the bulkhead wall 28 to seal the junction or mechanical connection of the fitting 21 and box 19.

A support bracket 31 may mount the box 19 for use at some location, e.g., inside or outside a building, at a distribution pole (e.g., power pole, telephone pole or the like), and so on. Such location may be referred to as "the field", e.g., a location that is where the distribution system 18 is in use as compared to in a factory at which the cable termination assemblies 10 may be manufactured. The distribution system 18 also or alternatively may be located and used in such a factory. Although this disclosure describes the cable termination assemblies 10 including components and methods suited to facilitate being manufactured, assembled and/or installed in the field, the cable termination assemblies also may be manufactured, assembled and/or installed at a factory.

Figure 2A:
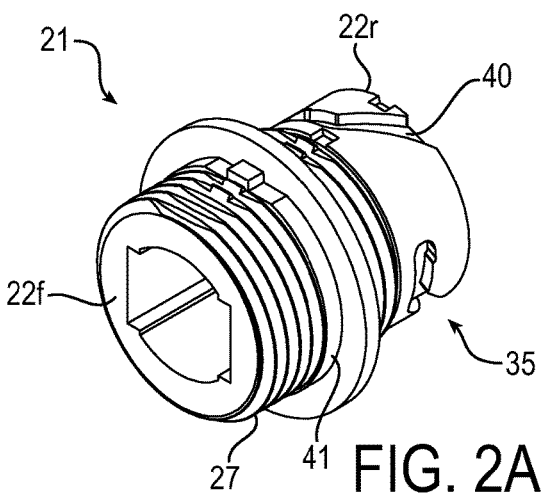
Figure 2B:
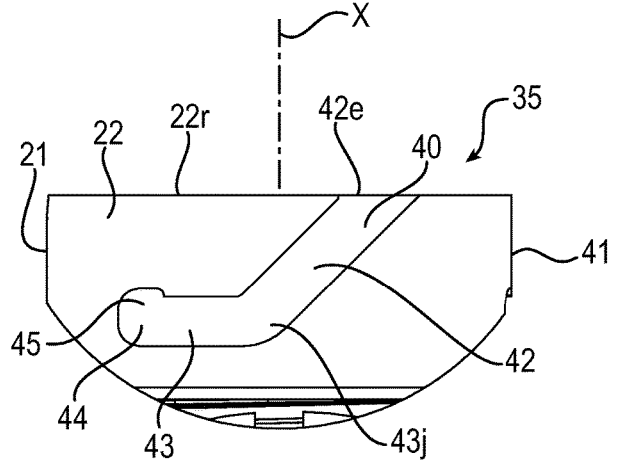
FIG. 2B is an enlarged fragmentary view of the fitting showing in detail one of the groove arrangements.
Figure 2C:
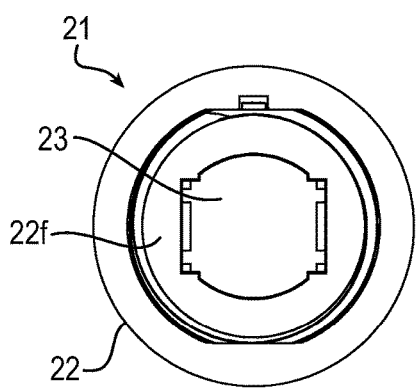
FIGS. 2C and 2D are, respectively, front and back (rear) views of the fitting.
Figure 2D:
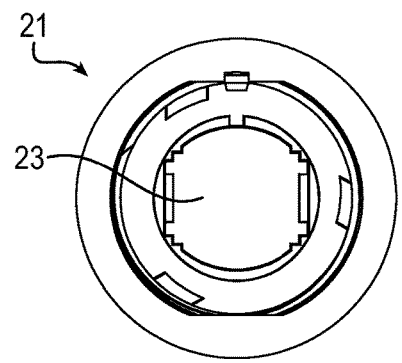
Figure 2E:
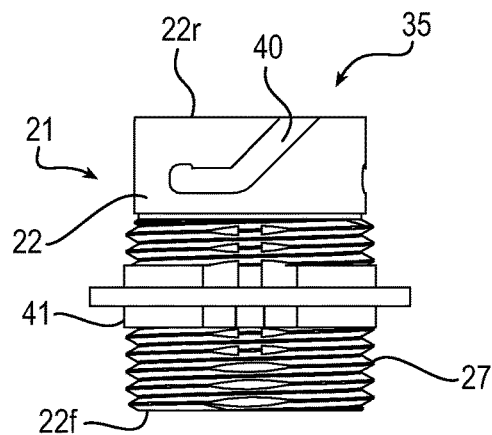
FIGS. 2E through 2H are, respectively, top, bottom, left side and right side elevation views of the fitting.
Figure 2F:
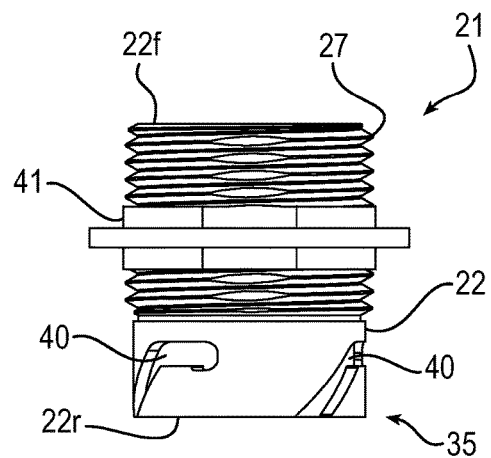
Figure 2G:
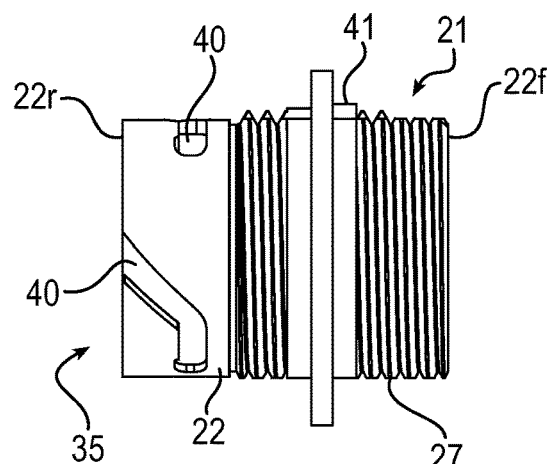
Figure 2H:
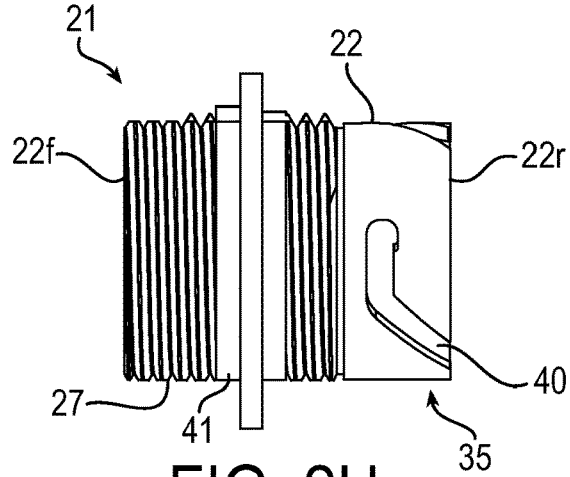
Figure 2I:
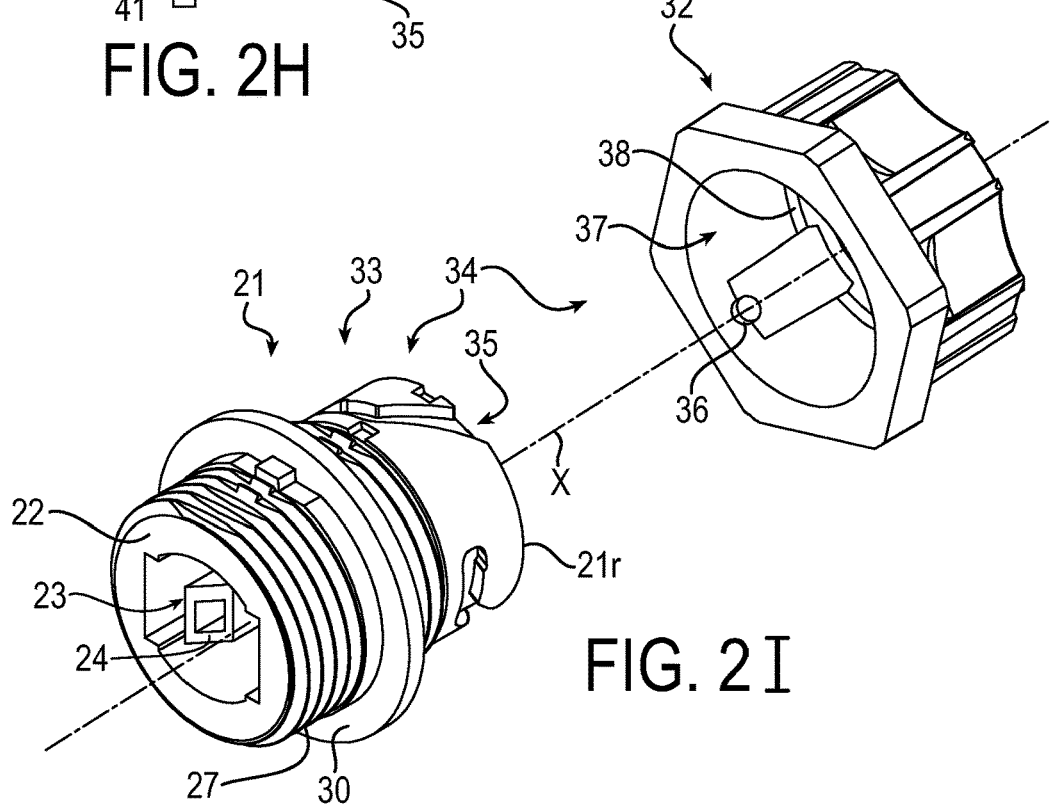
FIG. 2I is an exploded isometric view of the fitting 21 used in a bayonet attachment arrangement.

Reference is made to FIGS. 2A through 2I. FIG. 2A is an isometric view of the fitting 21 looking from the front. FIG. 2B is an enlarged fragmentary view of the fitting showing in detail one of the groove arrangements of a bayonet attachment mechanism. FIGS. 2C and 2D are, respectively, front and back (rear) views of the fitting 21. FIGS. 2E through 2H are, respectively, top, bottom, left side and right side elevation views of the fitting 21. FIG. 2I is an exploded isometric view of the fitting 21 used in a bayonet attachment arrangement.

As is seen in FIGS. 1, 2A through 2I, and 4, the termination assembly 10 includes a locking collar or attaching collar 32 that attaches to an attachment portion 33 of the bulkhead fitting 21. As is described below, the termination assembly 10 may be positioned with respect to the bulkhead fitting 21, e.g., to position the connector 13 in alignment with and to urge it into engagement with the connector 24 that is in the bulkhead fitting. The locking collar 32 may be attached securely to the attachment portion 33 of the bulkhead fitting 21. For example, the locking collar 32 and attachment portion 33 may be secured by mating of a bayonet attachment mechanism 34. For example, in FIGS. 2A through 2I and 3 a bayonet attachment mechanism 34 includes a groove arrangement 35 in the fitting attachment portion 33 and one or more protruding tabs or pins 36 at the hollow interior portion 37 of the locking collar 32 to mate with the groove arrangement. To attach the locking collar 32 to the fitting 21, the groove arrangement 35 and pins 36 are positioned in alignment and the locking collar is turned to move pins along grooves of the groove arrangement to draw the locking collar forward on the fitting to a locked or secured relation between the locking collar and fitting. A resilient member 38 (see FIG. 2I), such as a rubber or polymer O-ring or washer in the hollow interior of the locking collar 32 is compressed between the locking collar and the rear edge 21r of the fitting as the locking collar moves forward on the fitting and provides a reaction force tending to resist such turning of the locking collar as it is turned, as is described below.

In using the bayonet attachment mechanism 34, the locking collar 32 may be slid along the collar 14 toward the forward end thereof to engage flange 39 of the collar. The collar 14 may be urged against a rearward facing edge 21r of the fitting 21, and the locking collar may be rotated to align pins 36 in respective grooves of the groove arrangement 35. The locking collar may be turned further to move the pins along the respective grooves. As the locking collar 32 is turned, the pins 36 follow the grooves 40 of the slot arrangement 35 and the locking collar moves longitudinally along the attachment portion 32 of the fitting toward the forward end of the fitting. The resilient member 38 in the hollow interior of the locking collar 32 is compressed against the edge 21r of the fitting as the locking collar moves forward toward the flange 30. The compressed resilient member 38 provides friction with adjacent surfaces to tend to resist continued rotation of the locking collar 32 about the collar 14 while tending resiliently to urge the locking collar away from the fitting 21 generally in a direction along the longitudinal axis X of the fitting. Continued turning of the locking collar 32, though, causes a locking action with respect to grooves 40 of the groove arrangement 35, as is described below.

Referring to FIGS. 2A through 2I, the fitting 21 is shown. The fitting includes housing 22 having a hollow interior or passage 23 in which a conventional connector adapter 24 may be located. The connector adapter 24 may be of a type that is exposed to be accessed in the area of the front 22f and back or rear 22r of the fitting to be an interface to connect with respective connectors, such as SC, LC or other type of connector to couple signals therebetween, e.g., the connectors 13 and 25 (FIG. 1). The connector adapter 24 may be retained in the fitting 21 in a conventional manner. For example, it may be retained by a friction fit with walls bounding the hollow interior of the fitting 21, by an interference mechanical connection, e.g., a conventional ramp and groove or stop type interfit, or by some other retention mechanism.

The housing 22 has an exterior generally cylindrical wall 41. At the forward part of that wall 41 is the screw thread 27; and at the rearward part of the wall is the groove arrangement 35. In the illustrated exemplary embodiment the groove arrangement 35 includes three substantially identical grooves 40 that are in the exterior generally cylindrical wall 41, are circumferentially or angularly (e.g., polar angularly) spaced about the axis X, and are generally parallel to each other. There may be fewer or more than three grooves 40.

Each groove 40 includes a guiding groove portion 42 and a retaining groove portion 43, which are seen in enlarged view in FIG. 2B. The guiding groove portion 42 extends both axially and circumferentially, e.g., generally spirally, about at least a portion of the cylindrical wall 22, e.g., along and about the axis X, respectively. The guiding groove portion 42 has an entrance 42e at its distal end at the rear 22r of the fitting 21 to receive a protruding member, e.g., pin 36. The guiding groove portion 42 is configured to guide a protruding member, e.g., pin 36, of another device, e.g., the locking collar 32, along the guiding groove portion while cooperation of the guiding groove portion 42 with such protruding member (e.g., pin) 36 guides the other device (e.g., locking collar) 32 over at least part of the cylindrical wall 41 toward or onto the fitting housing 22. The guiding groove portion 42 joins the retaining groove portion 43 at a junction 43j of the groove portions to guide the protruding member into the retaining groove portion. The retaining groove portion 43 extends generally in a circumferential direction about the axis X or at least is more circumferential and less axial than is the guiding groove portion, e.g., generally or approximately in a plane that is perpendicular to the axis X. The groove portions guide the protruding member along the length of the groove 40. The guiding groove portion 42 tends to slope relative to the axis X from a location near or at the entrance 42e toward the retaining groove portion 43. The retaining groove portion 43 includes the positive lock 44, which also may be referred to as a positive stop.

The positive lock 44 is an engagement locking system that locks a female connector, e.g., locking collar 32, to the fitting 21. The positive lock 44 allows a female connector, e.g., the locking collar 32, with several, e.g., three, spaced, e.g., evenly spaced, internal locking pins 36 to slide into the angled grooves 40, which transition from a guiding groove portion 42 into an extended flat groove retaining groove portion 43, and then guides the pins 36 to a positive stop keyway 45, locking the female connector in place.

The positive lock 44 is provided in the retaining groove portion 43 to interact with the protruding member 36 to provide a relatively secure locking to retain such other device, e.g., the locking collar 32, with respect to the fitting 21. The positive lock 44 is provided by a recess 45 in a wall of the retaining groove portion 43. The recess 45 (also sometimes referred to as a keyway) extends to enlarge the retaining groove portion 43 in a direction toward the entrance 42e and rear 22r of the fitting.

The length of the retaining groove portion 43 is adequately long such that the recess or keyway 45 of the positive lock 44 is remote from the junction 43j. This provides a number of advantageous features. As a user turns the locking collar 32 on the fitting 21 with pins 36 in the grooves 40, there will be a sufficient number of turns or rotary motion of the locking collar on the fitting before the pins snap into the respective keyway recesses. That distance helps to assure that the person assembling the locking collar on the fitting will understand that continued turning is needed to lock the two together, i.e., until the pins snap into the respective recess or keyway 45. Also, since the recess 45 is distant from the junction 43j, it is unlikely that an inadvertent bumping or other action against the locked together locking collar and fitting would loosen the locked connection therebetween.

In an embodiment interaction between the positive lock 44 the protruding member 36 provides haptic feedback to indicate, e.g., to a service technician who is attaching the cable termination assembly 10 to the fitting 21, that relatively secure locking of such other device with respect to the fitting has been achieved. For example, the protruding member 36 may snap into the recess 45 of the positive lock 44 at the end of the retaining groove portion. For example, as the locking collar 32 is turned, the locking collar and the rear edge 22r of the fitting 21 apply force or pressure to tend to compress the resilient member 38 in the locking collar; the pin 36 is drawn to snap into the recess 45 of the positive lock 44 by force provided by the resilient member, thus relieving some of the force or pressure on the resilient member 38.

In attaching a fitting 21 to another device, e.g., to the locking collar 32 associated with a cable termination assembly 10 or to some other device, the other device, e.g., locking collar 32 is placed on a cylindrical wall of the fitting 21 while the interaction between a groove 40 in the cylindrical wall interacts with a protuberance, e.g., pin(s) 36 on the locking collar to guide the locking collar rotationally about the cylindrical wall. Continued relative rotating of the fitting and locking collar moves the protuberance (pin 36) into a positive lock location 44 in an extending retaining groove portion 43 of the groove. The method also includes providing haptic feedback indicating that the another device, e.g., the locking collar 32, and fitting 21 are securely held together.

Turning to FIG. 3, the cable termination assembly 10 is shown in assembled relation of the cable 12 and cable termination 11. For convenience of description and to provide a relative directional reference, the end of the cable termination assembly 10 facing the box 19 may be referred to herein as the forward end, and the other end may be referred to as the rearward end. The cable 12 may include, for example, a fiber optic member 12f enclosed within a protective jacket 12p. An optical connector 13, e.g., an SC connector, LC connector or some other type of optical connector, as may be available currently or may become available in the future, is attached to the fiber optic member to couple optical signals therebetween and to provide for coupling optical signals via the connector with respect to another device, such as, for example, the connectors 24 and 25 (both shown in FIG. 1). The locking collar 32 is at one end 60 (sometimes referred to as the forward end or connector end) of an elongate hollow cylindrical collar 14, which provides mounting, support, and protection from damage for the connector 13 and cable 12 and their connection in the cable termination assembly 10, and the cable strain relief 15 is at the other end 61 of the collar 14 (sometimes referred to as the rearward end, cable end or strain relief end). As was mentioned above, the locking collar 32 may be used to attach the termination assembly 10 to a bulkhead fitting 21. The strain relief 15 resists pulling of the cable 12 out from the termination assembly 10, e.g., toward the right-hand direction relative to the illustrations in the drawings.

Figure 4:
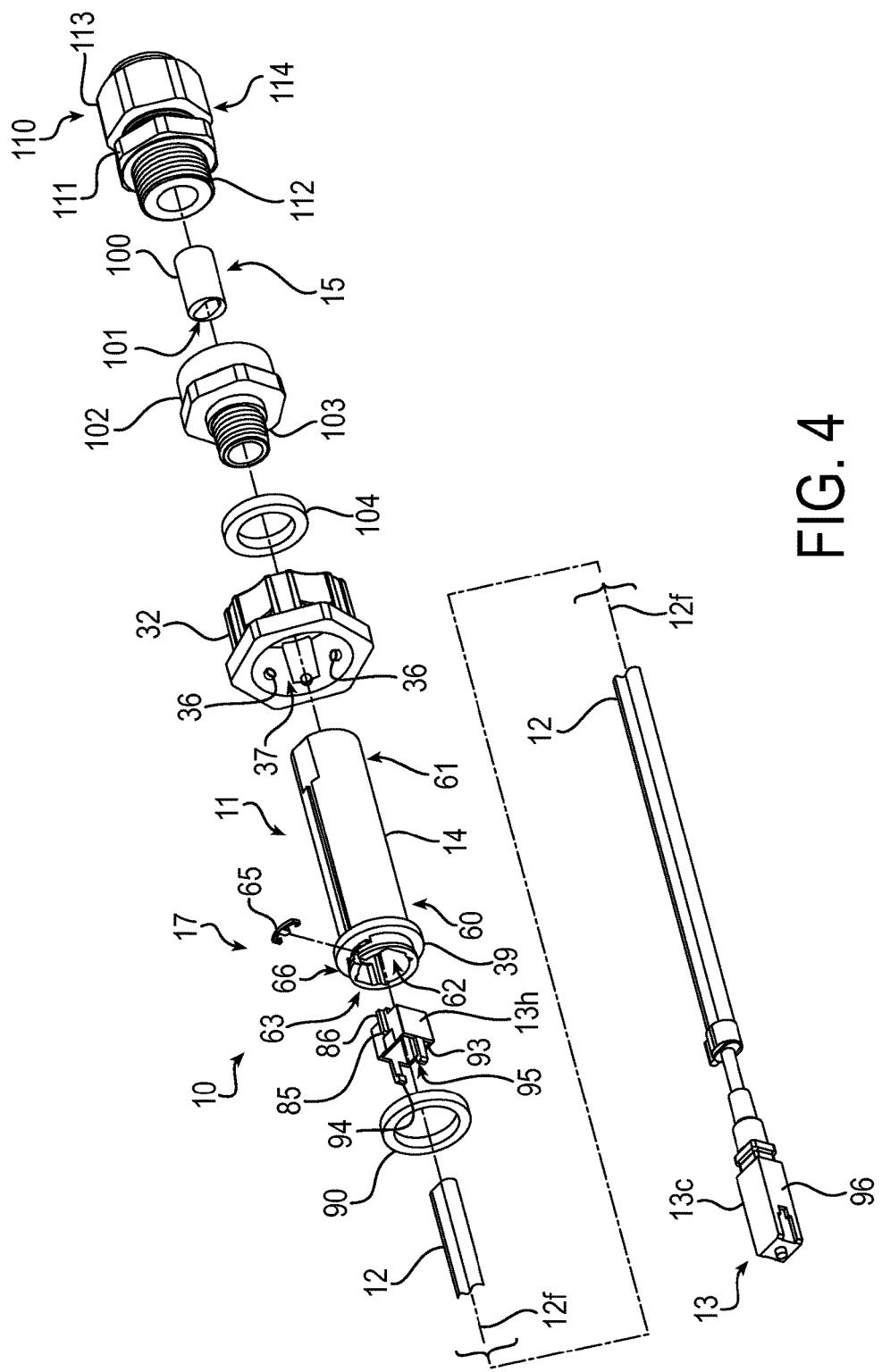
FIG. 4 is an exploded isometric view of the cable termination assembly of FIGS. 1 and 3.
Figure 5:
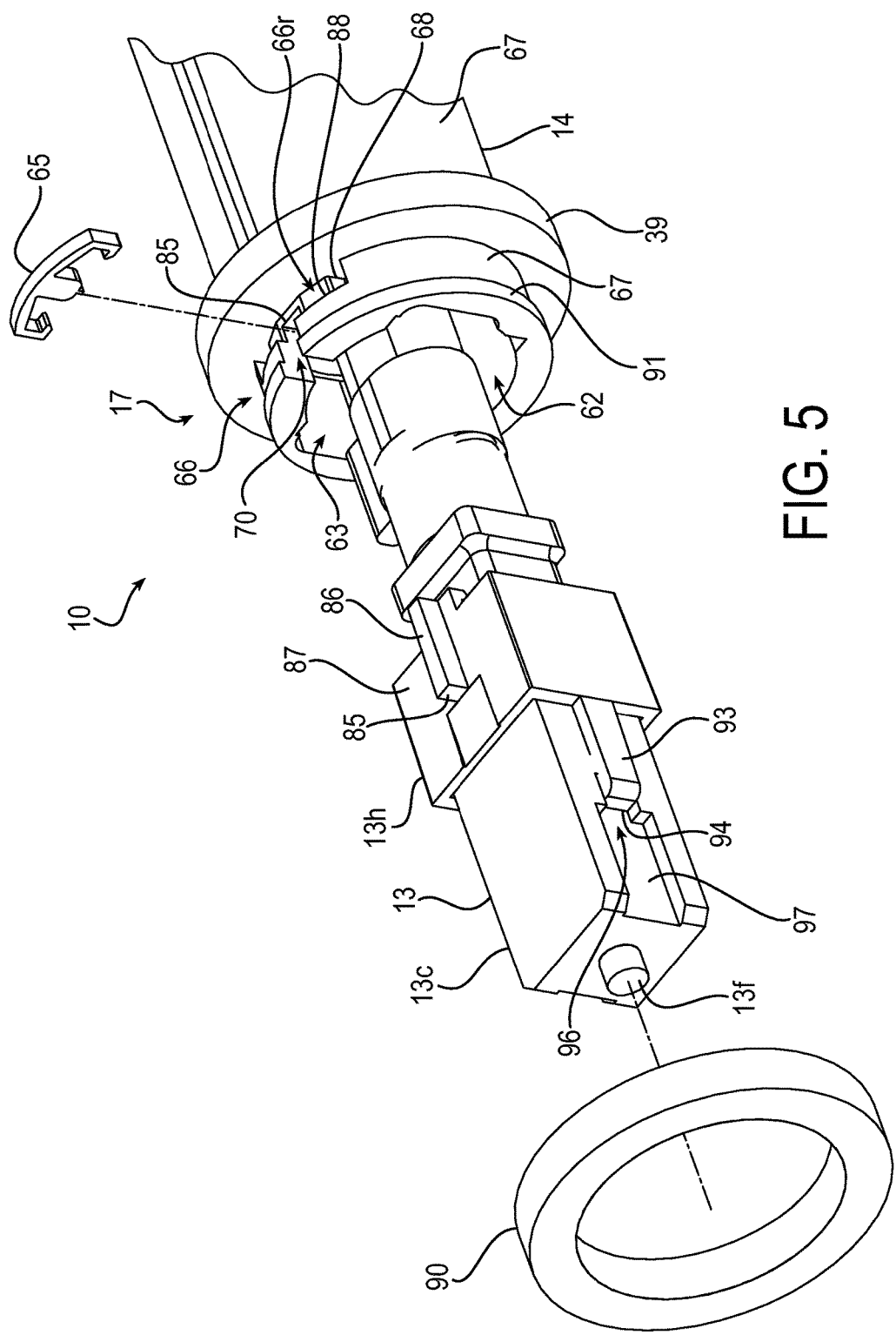
FIG. 5 is an enlarged fragmentary partly exploded isometric view of the connector end of the cable termination assembly of FIGS. 1, 3 and 4.
Figure 6:
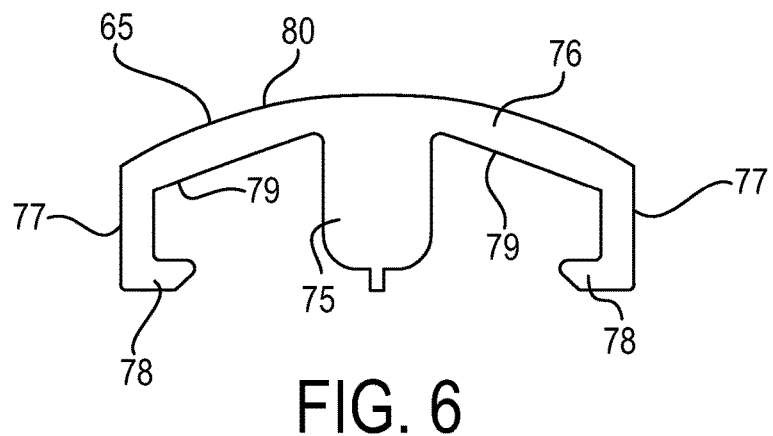
FIG. 6 is a plan view of a retaining clip of the cable termination assembly.
Figure 7:
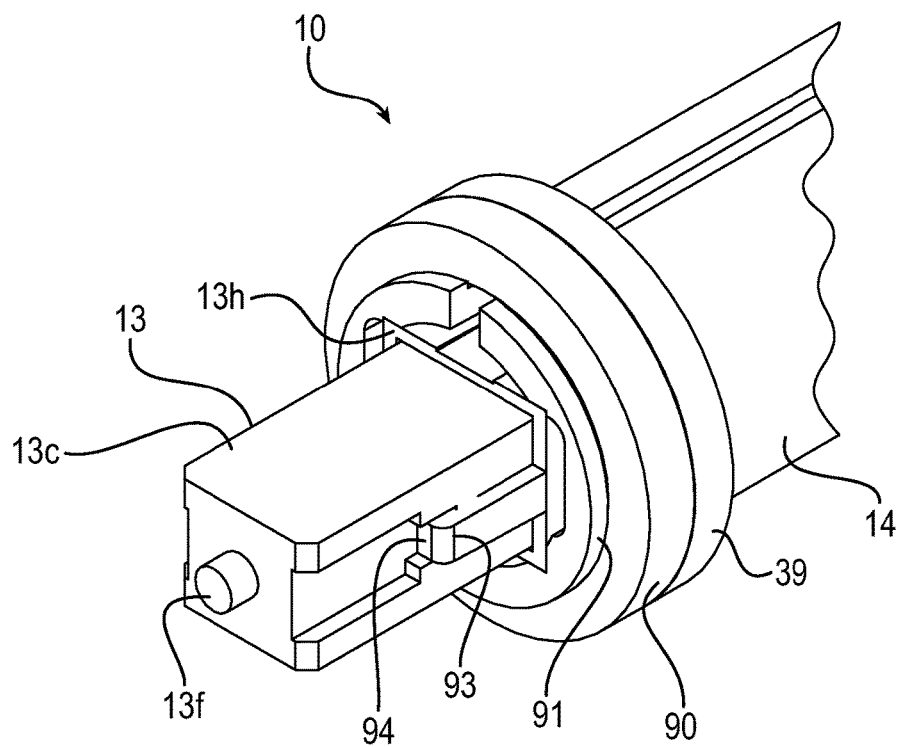
FIG. 7 is an enlarged fragmentary isometric view of a connector assembled with respect to a housing or support of the cable termination assembly.

Turning to FIGS. 4-7, the cable termination assembly 10 is illustrated in further detail. The connector 13 includes a connector portion 13c and a holder portion 13h. The connector portion 13c is connected to the fiber optic member 12f and provides optical connection to an optical ferule 13f, which is used to couple optical signals between the optical connector and another device, e.g., to the optical connector 24 in the bulkhead fitting 21. The holder portion 13h holds to the connector portion 13c and facilitates mounting the connector in the collar 14. The collar 14 has a hollow interior 62, one end 60 (the connector end or forward end) of which is configured to match generally the shape and dimensions of the connector 13, for example, the holder portion 13h, as is seen in FIGS. 5 and 7. At the other end 61 (rearward end) of the collar 14 is the strain relief 15.

Referring also to FIGS. 6-13, features of the insertion limiting mechanism (also referred to as stop) 16 and the retainer mechanism 17 are shown. These mechanisms 16 and 17 cooperate with the connector 13 and collar 14 positioning and retaining the connector with respect to the collar. The stop 16 in the hollow interior 62 of the collar 14 restricts or limits the distance or length of insertion of the connector 13 into the collar, e.g., to a positioning as is shown in FIG. 7, where the connector is shown already inserted to a maximum extent into the hollow interior of the collar.

Figure 11:
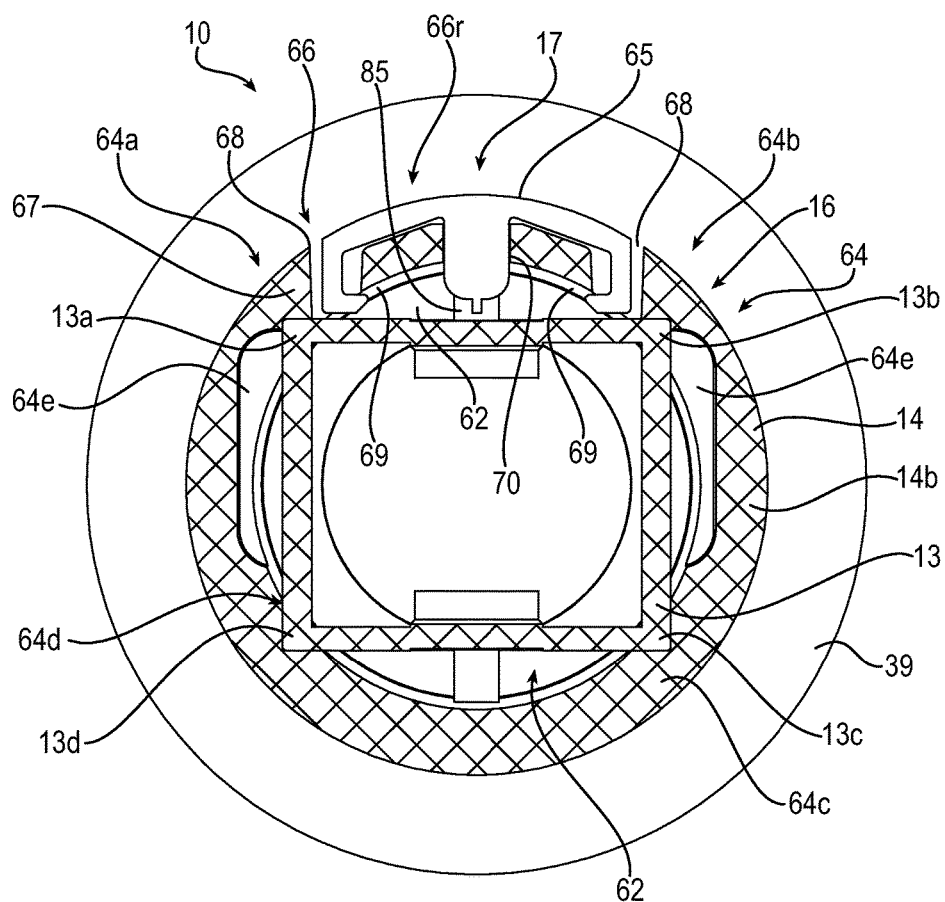
FIG. 11 is a section view of the cable termination looking in the direction of the arrows 11-11 of FIG. 8.
Figure 12:
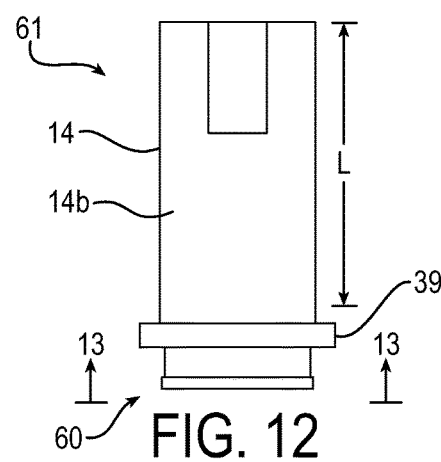
FIG. 12 is a top plan view of the housing or collar of the cable termination.
Figure 13:
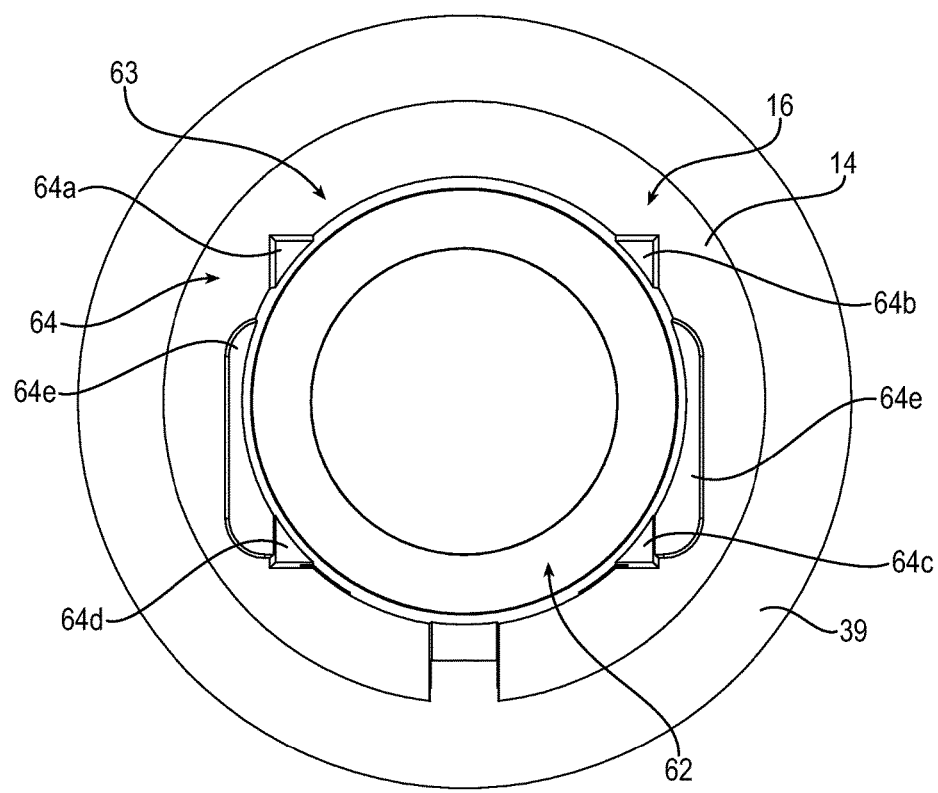
FIG. 13 is a front view of the housing or collar of the cable termination looking in the direction of the arrows 13-13 of FIG. 12.

The insertion limiting mechanism 16 stops, limits or restricts the insertion of the connector 13 at the proper position in the hollow interior 62 of the collar 14. This is accomplished by a change in cross-section of the collar 14 at a point or location in the hollow interior 62 where the inserted end of the connector 13 is intended to be stopped. In FIGS. 11 and 13 the change in cross-section in the collar is shown. In the section view of FIG. 11 the change in cross section of the collar 14 is shown with a connector 13 in the collar; and for clarity the illustration of the collar 14 in FIG. 13 is shown as a front elevation view without any other parts in position in the collar.

As is shown in FIGS. 8-13, a length L of the hollow interior 62 of the collar 14 from the back or rear end 61 toward the forward end 60 is, for example, generally of circular cross section or of other cross section adequate to pass the cable 12 along that length. That hollow circular cross section interior 62 is surrounded by the body 14b of the collar 14. At the forward end 60 the cross section of the hollow interior 62 is configured or is of a configuration that corresponds to a form factor of the connector 13 to provide a space 63 to permit the connector to be inserted into the hollow interior. However, there is a change in cross section area of the hollow interior 62 where the forward end of the circular cross section space of length L meets the space 63 and this change in cross section area provides a surface 64 (FIG. 13) in the hollow interior 62. The surface 64 is the insertion limiting mechanism or stop 16 that interferes with or engages the connector 13 to limit, restrict or stop the connector 13 from passing further into the hollow interior 62 beyond the surface or stop 64.

As is seen in FIGS. 9, 10, 11 and 13, the surface or stop 64 is formed by four portions 64a, 64b, 64c and 64d that are as lands, which interfere with four respective corners of the connector 13a, 13b, 13c and 13d. This arrangement and shape of the four stops or lands 64a-64d and the four corners 13a-13d are configured and coordinated for use with an SC type connector to provide for proper positioning of the connector in the collar.

Also as seen in FIGS. 9, 10 11 and 13 there may be different or additional cross section changes between the circular cross section hollow interior along length L, on the one hand, and space that is of a form factor coordinated with the form factor of a different connector than the mentioned SC type connector. For example, a cross section change that provides surfaces or stops 64e also is shown. The surfaces or stops 64e are of a configuration coordinated with the form factor of an LC connector. Of course, other shapes and configurations may be used to provide the function of positioning a connector in the hollow interior 62 of the collar 14.

Alternatively, the stop 16 may be a surface or protrusion that protrudes inwardly from the inner surface of the interior of the collar 14. For example, the stop 16 may be simply one or more protruding tabs or pin-like member(s), may be a reduced cross sectional area of the collar compared to a larger cross sectional area at the forward end of the collar at which the optical connector 13 is inserted into the collar, may be a relatively thin (e.g., thin in the axial direction of the collar 14) internal flange-like surface or wall protruding from the internal wall of the collar and extending partly or fully about the hollow interior 62, etc.

The insertion limiting mechanism (stop) 16 restricts or limits the extent that the connector 13 may be inserted into the hollow interior of the collar and also allows or provides space in the hollow interior 62 for the cable 12 to pass through the collar between the connection of the cable to the connector at or near the connector end 60 to the cable end (also referred to as rear, rearward or back end or the like) 61 of the collar 14 where the strain relief 15 is located.

With the connector 13 positioned such that at least part is inserted in the hollow interior 62 of the collar 14 at the connector end 60, the retainer mechanism 17 prevents that part of the connector 13 from exiting the hollow interior from the connector end, e.g., blocks or prevents the connector from falling out or from being pulled out from the collar 14. For example, when the cable termination assembly is pulled away from the connector 24 that is in the bulkhead fitting 21 a strain may be applied to the connector 13 tending to pull the connector 13 out from the collar 14; the retainer mechanism 17 prevents the connector 13 from exiting the collar from the forward end 60 of the collar, e.g., being pulled out from the collar.

It will be appreciated that the stop 16 limits or restricts the distance that the connector 13 may be inserted into the hollow interior 62 of the collar 14 and the retainer mechanism 17 blocks exiting of the connector from the connector end 60 of the collar, e.g., preventing the connector from falling out or being pulled out. Therefore, the stop 16 and retainer mechanism 17 help to assure desired positioning of the connector 13 in the collar 14.

Referring to FIGS. 5, 6 and 11, the retainer mechanism 17 includes a retaining clip 65 (sometimes referred to herein as clip) and an opening 66 in the collar 14. The clip 65 is positionable in the opening 66 in the collar 14 to block exiting of the optical connector 13 from the collar past the clip. The opening 66 may be a groove or slot-like recess or gap 66r (sometimes referred to herein as opening, slot-like opening or slot) in the collar wall 67. A pair of through portions or retainer openings 68 at or near ends of the slot-like recess 66r extend through the collar wall 67 into the hollow interior 62 of the collar. Adjacent where the through portions 68 open into the hollow interior 62 are surface areas or lands 69, which cooperate with the clip 65 to hold the clip in position in the collar 14, as is described further below. An open space 70 through the collar wall 67 is cooperative with a protrusion, stop or surface 75 (FIG. 6) (also sometimes referred to as protruding stop surface) of the clip 65 to pass the stop 75 into the hollow interior 62 in position to block the connector 13 from exiting the collar, as also is described further below.

As is shown in FIG. 6, the retaining clip 65 includes the protrusion or protruding stop surface 75 that extends from a base 76. Arms 77 extend out from the base 76 and terminate at respective fastening or securement ends, such as, for example, the illustrated hook-like or barb-like tips 78 at their respective ends. The clip 65 may be made by stamping it from sheet metal material or it may be otherwise formed, e.g., by molding. The parts of the clip 65 may be coplanar, e.g., it may be basically flat, although if desired it may be of some other shape. The clip may be of relatively strong material, e.g., metal or strong plastic, as it functions to block the connector 13 from exiting from the collar 14.

The clip 65 is of a size and shape to fit in the opening 66 at the forward end (connector end) 60 of the collar 14. For example, the protruding base 76 fits in the slot-like recess or groove 66r, and the stop surface 75 fits into and through the through opening or space 70 of opening 66 into the hollow interior 62 of the collar 14. Also, the arms 77 fit in the retainer openings 68. The arms 77 may be resilient to resiliently urge the hooks or barbs 78 into engagement with respective walls of retainer openings 68. The hooks or barbs 78 slide along such walls as the clip 65 is pressed or otherwise urged into and through respective retainer openings 68 such that after the hooks or barbs pass the lands 69, the arms spring back to locate the hooks or barbs directly beneath respective lands. The hooks or barbs 78 tend to lock or hold at or beneath the lands 69 to hold the clip 65 in position in the opening 66. Therefore, the clip will not fall out of the opening 66, and the clip will remain in position in the collar to block the connector 13 from exiting the collar. Alternatively, the hooks or barbs 78 may dig into respective walls of the retainer openings 68 to tend to hold the clip 65 in place without the arms 77 reaching the hollow interior 62. Further, with the clip 65 positioned in the opening 66, the bottom surface or edge 79 of the base 76 engages or is closely in position adjacent the floor of the gap or groove 66r so that the clip base is recessed in the gap or groove 66r such that top edge 80 of the clip is about at the level of the exterior of the collar wall 67, e.g., coplanar or approximately coplanar in a circular sense with the collar wall 67.

Thus, it will be appreciated that the retaining clip 65 is pressed into the collar 14 at the slot-like opening 66 such that stop surface 75 protrudes into the hollow interior 62 of the collar 14 and part of the base 76 of the retaining clip cooperates with walls forming the gap or groove 66r so that the clip retains the connector 13 in the collar, as is described further below. The arms 77 in the retainer openings 68 tend to lock the retaining clip in place in the collar 14.

Referring to FIGS. 4, 5 and 11, the optical connector 13 includes an interference surface 85. The interference surface 85 is at the forward end of a raised platform 86 that extends above the plane of one surface 87 of the connector holder portion 13h. The platform 86 and interference surface 85 may be considered a securement tab that cooperates with the protrusion 75 of the retaining clip to tend to hold the connector 13 in position with respect to the collar 14 to prevent the connector from exiting the collar.

In assembling the cable termination assembly 10, the connector 13, which already is attached to the fiber optic member 12f of the cable 12, is inserted at the connector end 60 into the hollow interior 62 of the collar 14 such that the interference surface 85 is inserted past or beyond the slot-like opening 66 toward the stop 16. For example, such inserting may be sufficient to cause the connector 13 to engage the stop 16 inside the collar 14. The cable 12 extends through the collar 14 and exits the rearward end 61 of the collar. With the connector so inserted into the collar, the retaining clip 65 then may be inserted into the opening 66 in position such that the protrusion 75 is aligned with the interference surface 85 so as to block exiting of the connector from the collar. Thus, the retaining clip 65 is positionable with respect to the collar 14, e.g., in the opening 66, such that the protrusion 75 passes into the hollow interior 62 of the collar in front of the interference surface 85, to engage the interference surface 85 if a force were applied to the optical connector 13 tending to pull it out from the connector end 60 of the collar 14, thereby to block exiting of the optical connector from the collar. By preventing the connector 13 from being pulled out from the collar 14 also prevents the cable 12, which is attached to the connector 13, from being pulled out of the collar.

In FIG. 5 a clip stop wall 88 is shown. The clip stop wall 88 is at the forward side of the recess 66r of the slot-like opening 66. The clip stop wall 88 and forward facing surface of the clip base 76 face each other, when the clip 65 is in position in the slot-like opening 66, so that if a force were applied to the optical connector 13 tending to pull it forward out from the collar, the protrusion 75 would block exiting of the optical connector. The clip stop wall 88 blocks or supports the clip 65 from being pulled forward out of the slot-like opening 66. Interaction between walls of the retainer openings 68 and the clip arms 77 further buttress against forward movement of the clip in response to such a pulling forward force being applied to the optical connector 13.

A resilient washer, O-ring, or the like 90 (sometimes referred to as resilient member or sealing member, but for convenience referred to below collectively as washer or sealing member) is of size and shape such that it can be resiliently stretched to fit over the collar 14 across a rim portion 91 at the forward end of the collar wall 67 into position on the collar wall. A flange or wall 39 on the outside of the collar 14 provides a back stop, support or guide to help locate the washer 90 on the collar so that the washer conveniently may be positioned on the collar between the rim portion 91 and flange 39. For example, the washer 90 may be pushed over the rim portion 91 toward engagement with the flange 39, thus guiding the washer into position on the collar 14. After the washer 90 has been positioned to circumscribe the collar wall 67 between the rim portion 91 and flange 39, the stretch may be released so that the washer 90 engages and holds to the collar wall. The final positioning of the washer 90 with respect to the flange 39 is seen in FIG. 7. The O-ring or washer 90 also may act as a spring to help keep the locking cap 32 in position and secured to the bulkhead fitting 21. The washer 90 also may provide a watertight seal over the opening 66 and clip 65.

The flange 39 also is cooperative with the locking cap 32 in mounting or attaching the cable termination assembly 10 to the bulkhead fitting 21 (FIG. 1). To attach the cable termination assembly 10 to the bulkhead fitting, the cable termination assembly is positioned such that the connector portion 13c of the optical connector 13 is aligned with the connector 24 in the bulkhead fitting 21 and then the optical connector 13 is pushed into the connector 24. As the optical connector 13 is pushed into the connector 33 to make connection therewith, e.g., mechanical connection and/or optical connection, the forward end 60 of the collar 14 with the washer 90 is pressed against the rearward facing edge 33r of the attachment portion 33 of the bulkhead fitting 21. With the resilient washer 90 engaged with the edge 33r, the locking cap 32 may be slid forward along the external surface of the collar 14 to engage the locking cap. The locking cap 32 then may be tightened to the bulkhead fitting 21 by a securement feature, such as a bayonet connection therebetween, a threaded connection therebetween, and so on. During such tightening of the locking cap 32 to the bulkhead fitting, the interior wall of the locking cap presses against the flange 39 tending to urge both the flange 39 and the edge 33r to bear against the washer 90 to provide a watertight (and/or weathertight—watertight and weathertight are used equivalently and interchangeably herein) seal between the cable termination assembly 10 and the bulkhead fitting 21. For example, the washer 90 may be compressed to some extent to provide such watertight seal characteristic. To enhance such watertight seal, the washer 90 may be waterproof.

The position of the washer 90 on the collar 14 may be such that it is over at least part of the retaining clip 65, which is positioned in the slot-like opening 66 in the collar. The washer 90 may cover the opening 66 and block exiting of the retaining clip from the opening 66, e.g., to avoid falling out or being pulled or forced out of the opening.

The flange 39 may be an integral part of the collar 14, e.g., the collar may be molded of plastic or of other material and the flange 39 may be molded or formed as an integral part of the major extent of the collar. As is shown, the collar is a linear cylinder, for example, and the flange 39 circumscribes the collar about the exterior surface of the collar.

As is seen in FIGS. 4, 5 and 7, the optical connector 13 includes a housing that includes a holder portion 13h and a connector portion 13c. Those portions are held together by holder portion arms 93 that have protruding tabs 94. The connector portion 13c and holder portion 13h may be slid together such that part of the connector portion 13c is positioned in a hollow interior space 95 (FIG. 4) of the holder portion 13h. The holder portion arms 93 are flexible and resilient to resiliently urge the tabs 94 to engage a surface 96 at the end of a respective recess 97 in the exterior surface at two sides of the connector portion 13c housing thereby to hold the connector portion 13c and holder portion 13h together. Two of such arms 93 are seen in FIG. 4. In the assembled optical connector 13 isometric views of FIGS. 5 and 7 only one of those arms 93 and one of the recess 97 are seen. The holder portion 13h is of a configuration to fit over a standard SC fiber optic connector 13c to retain it in the collar 14 by the retaining clip 65, as is described above, e.g., the protrusion 75 cooperates with the interference surface 85 to block exiting of the connector from the collar. Moreover, the shape or configuration of the entrance to the open interior 62 of the of the collar 14 at the forward or connector end 60 is configured to cooperate with the shape (form factor) of the holder portion 13h of the connector 13 to prevent the holder portion from rotating relative to the collar 14 and relative to the cable 12 and the fiber optic member 12f of the cable. The configuration of the holder portion 13h of the connector 13 and the configuration of the connector portion 13c are cooperative such that the connector portion does not rotate relative to the holder portion or move axially or longitudinally (e.g., front to back) relative to the collar 14, and, therefore, does not rotate or move axially or longitudinally relative to the cable or fiber optic member.

Figure 14:
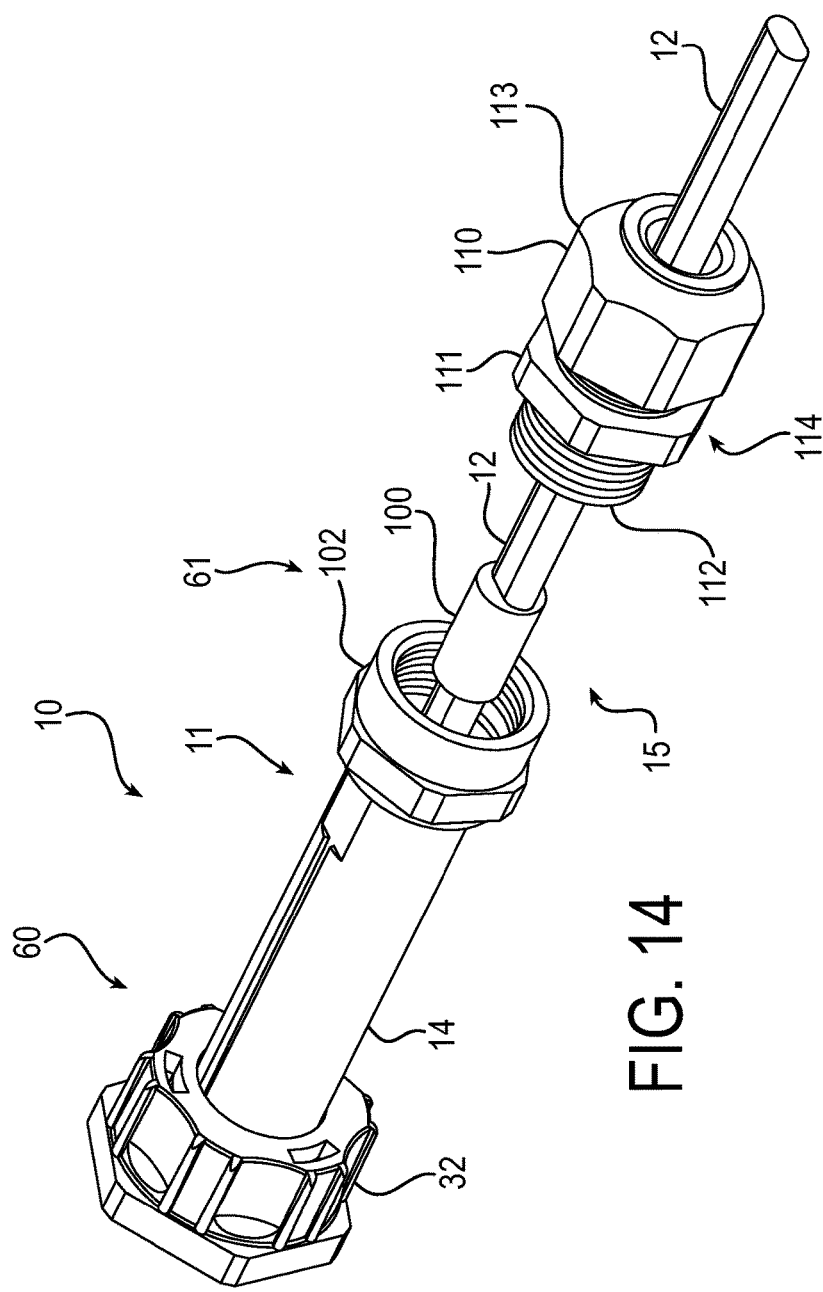
FIG. 14 is an enlarged partly exploded isometric view of the cable termination assembly featuring the strain relief thereof.

Referring to FIGS. 4 and 14, the strain relief 15 at the rearward end 61 of the collar 14 includes a flexible, resilient sleeve 100. The sleeve 100 has a hollow interior 101 that is configured to conform to the external shape of the cable 12. The sleeve 100 is slid on the cable to a location near the rearward end 61 of the collar 14. For example, the sleeve can be slid on the cable 12 at the forward end of the cable before the cable is attached to the connector 13 or can be slid on the cable from the rearward end of the cable. The cable 12 may be of a somewhat flat or elliptical cross section, and the sleeve is configured to present a circular exterior shape that conveniently and effectively can be compressed in and as part of the strain relief.

The strain relief 15 also includes an adapter fitting 102 that screws into the rearward end 61 of the collar 14 at a threaded connection 103 together with a sealing washer or O-ring 104 (seen in FIG. 4), which avoids or blocks leakage, e.g., a watertight connection.

A two-part compression fitting 110 fits over the cable 12. The forward part 111 of the compression fitting 110 may be slid along the cable 12 to a position over the sleeve. The forward part 111 may be attached to the adapter fitting 102 at a threaded connection 112. The adapter fitting 102 adapts the collar 14 and the compression fitting 110 of the strain relief 15 to be attached to each other.

The forward part 111 of the compression fitting includes a number of resilient fingers or other resilient member(s) or part(s) that are not shown. Those resilient fingers or member(s) may be positioned to engage the sleeve 100. The circular cross section of the sleeve 100 facilitates uniform and secure engagement by the resilient fingers, or resilient member(s) or part(s). The rearward part 113 of the compression fitting 110 may be screwed onto the forward part 111 at a threaded connection 114. The rearward part 113 has a hollow interior area of a shape, e.g., tapered, to cooperate with the resilient fingers or resilient member(s) or part(s) to urge them to compress against the sleeve 100 urging the sleeve against the cable 12 as the rearward part is screwed onto the forward part 111.

Thus, when the rearward part 113 of the compression fitting 104 is screwed on the forward part 111, the rearward part causes resilient fingers or resilient member(s) or part(s) to apply compression force against the sleeve to urge the sleeve in close, conforming resilient engagement with the cable 12. Such compression force against the sleeve 100 also causes close, conforming resilient engagement of the sleeve with walls of one or both of the fitting parts 111, 113 and, as is mentioned above, with the resilient fingers or resilient member(s) or part(s). Such engagements of the sleeve with the cable and of the sleeve with the fitting 110 provides a compression and frictional force on the cable 12 tending to resist or to oppose strain or force that may be applied to the cable that would try to pull the cable from the cable termination assembly 10. Further, the close, conforming resilient engagements mentioned provide a watertight seal of for the interior of the cable termination assembly at the rearward end 61 of the collar 14.

The preferred embodiments of the present disclosure are described above with reference to the drawings. Many features and advantages of those embodiments are apparent from the detailed Specification, thus the accompanied claims intend to cover all such features and advantages of those embodiments which fall within the spirit, scope and connotation thereof. The embodiments of the present disclosure are not limited to the exact structures and operations as illustrated and described, and they cover all suitable modifications and equivalents falling within the scope of the claims.

I claim:

1. A fitting assembly including:
   a fitting for signal connector coupling, comprising
   a housing at least part of which is configured to receive at least part of a signal connector,
   the housing including a cylindrical wall extending along an axis and circumscribing a hollow interior space,
   a groove in the cylindrical wall, the groove including a guiding groove portion and a retaining groove portion,
   the guiding groove portion extending both axially and circumferentially about at least a portion of the cylindrical wall,
   the guiding groove portion configured to guide a protruding member of another device along the groove while cooperation of the guiding groove with such protruding member guides such another device over at least part of the cylindrical wall toward the housing,
   wherein the retaining groove portion extends generally in a circumferential direction about the axis, and
   further comprising a positive lock in the retaining groove portion configured to interact with such protruding member provide a relatively secure locking to retain such other device with respect to the fitting;
   the another device, which is attachable to the fitting; and
   a resilient member that is configured to urge the cylindrical wall of the fitting and the another device axially apart when the protruding member of the another device is in the retaining groove portion and apart from the positive lock.

2. The fitting assembly of claim 1, wherein interaction between the positive lock and such protruding member provides haptic feedback to indicate relatively secure locking of such other device with respect to the fitting.

3. The fitting assembly of claim 1, wherein the guiding groove portion extends spirally in the exterior surface of the cylindrical wall at least partly about and along at least part of the length of the axis.

4. The fitting assembly of claim 1, wherein the cylindrical wall has a distal end at which the groove has an entrance portion, and wherein the guiding groove portion extends from the entrance portion to the retaining groove portion, and wherein the portions of the groove are connected to provide a path for movement of the protruding member along at least substantially the entire length of the groove.

5. The fitting assembly of claim 4, wherein the guiding groove portion extends in a sloping direction relative to the axis of the cylindrical wall from a location at least one of at or near the entrance portion toward the retaining groove portion, and wherein the retaining groove portion extends circumferentially about a portion of the cylindrical wall in a plane that is substantially perpendicular to the axis.

6. The fitting assembly of claim 4, wherein the positive lock includes a recess in a wall of the retaining groove portion.

7. The fitting assembly of claim 1, wherein the housing includes a signal connector configured to connect with an optical cable termination for coupling optical signals between the signal connector and the optical cable termination.

8. The fitting assembly of claim 7, wherein the signal connector is configured to connect at one end with such optical cable termination and at another end with a further optical cable termination.

9. The fitting assembly of claim 1, wherein the housing further includes a mechanical connecting portion configured to connect the fitting to a mounting structure.

10. The fitting assembly of claim 9, wherein the mechanical connecting portion includes a fastenable cylindrical wall circumscribing a hollow interior, at least part of the fastenable cylindrical wall configured for inserting into a mounting opening of such mounting structure.

11. The fitting assembly of claim 10, wherein the fastenable cylindrical wall is threaded, and further comprising a threaded member that may be threaded onto the thread of the fastenable cylindrical wall to secure the fitting to such mounting structure.

12. The fitting assembly of claim 1, comprising a plurality of said grooves, each including a guiding groove portion and a retaining groove portion.

13. The fitting assembly of claim 12, wherein the guiding groove portions are generally parallel to each other in the exterior surface of the cylindrical wall; and the retaining groove portions are generally parallel to each other in the exterior surface of the cylindrical wall.

14. The fitting assembly of claim 13, wherein the plurality of said grooves comprises a total of three grooves that are in the exterior surface of the cylindrical wall and are angularly spaced apart from each other about the axis.

15. The fitting assembly of claim 1, wherein the another device includes a generally cylindrical mounting wall about a hollow interior area configured to fit over and generally parallel to at least part of the cylindrical wall of the fitting, the cylindrical mounting wall having a protruding protuberance configured to fit in and to slide along the groove toward the positive lock and to fit with respect to the positive lock to resist separating of the another device from the fitting.

16. The fitting assembly of claim 15, wherein the protruding protuberance and the guiding groove portion guide the another device to rotate about the axis of the fitting while the another device is urged along the cylindrical wall of the fitting, and upon reaching the retaining groove portion, in response to rotating of the fitting and the another device relative to each other the protruding protuberance moves along the retaining groove portion to the positive lock.

17. The fitting assembly of claim 15, wherein there are a number of protruding protuberances axially spaced from each other along the inner surface of the cylindrical mounting wall cooperative with respective grooves in the cylindrical wall of the fitting.

18. The fitting assembly of claim 15, wherein the resilient member is positioned to be compressed between the cylindrical wall and the another device in response to the another device being placed sufficiently in mounted position on the fitting tending so as to urge the another device and fitting away from each other and to urge the protruding member into retained position in the positive lock.

19. The fitting assembly of claim 1, wherein the retaining groove portion extends relatively more in a circumferential direction with relatively minimal axial directional component with respect to the axis than does the guiding groove portion that extends with a relatively more axial directional component.

20. The fitting assembly of claim 1, wherein the resilient member is configured to urge the cylindrical wall of the fitting and the another device axially apart when the protruding member of the another device is in the guiding groove portion, whereby when the protruding member of the another device is in the guiding groove portion and moved progressively circumferentially toward the retaining groove portion the resilient member urges the cylindrical wall axially apart from the another device with a progressively increasing force.

21. The fitting assembly of claim 1, wherein the resilient member is an O-ring.

* * * * *